United States Patent
Tajima et al.

(10) Patent No.: US 12,124,364 B2
(45) Date of Patent: Oct. 22, 2024

(54) RANDOM NUMBER QUALITY MANAGEMENT METHOD AND APPARATUS

(71) Applicant: NEC Corporation, Tokyo (JP)

(72) Inventors: Akio Tajima, Tokyo (JP); Ken-ichiro Yoshino, Tokyo (JP)

(73) Assignee: NEC CORPORATION, Tokyo (JP)

(*) Notice: Subject to any disclaimer, the term of this patent is extended or adjusted under 35 U.S.C. 154(b) by 851 days.

(21) Appl. No.: 17/284,016

(22) PCT Filed: Oct. 19, 2018

(86) PCT No.: PCT/JP2018/039054
§ 371 (c)(1),
(2) Date: Apr. 9, 2021

(87) PCT Pub. No.: WO2020/079841
PCT Pub. Date: Apr. 23, 2020

(65) Prior Publication Data
US 2021/0382817 A1   Dec. 9, 2021

(51) Int. Cl.
G06F 11/36   (2006.01)
G06F 7/58    (2006.01)
H04L 9/08    (2006.01)

(52) U.S. Cl.
CPC .......... *G06F 11/3692* (2013.01); *G06F 7/588* (2013.01); *G06F 11/3688* (2013.01); *H04L 9/0852* (2013.01)

(58) Field of Classification Search
CPC . G06F 7/58–588; G06F 11/3688–3696; H04L 9/08; H04L 9/0838–0852; H04L 9/0869
See application file for complete search history.

(56) References Cited

U.S. PATENT DOCUMENTS

| | | |
|---|---|---|
| 2008/0052577 A1 | 2/2008 | Tanaka et al. |
| 2012/0314867 A1* | 12/2012 | Tomaru .............. H04L 9/08 380/270 |
| 2019/0044713 A1 | 2/2019 | Tomita et al. |

FOREIGN PATENT DOCUMENTS

| | | |
|---|---|---|
| JP | 2007187698 A | 7/2007 |
| JP | 2014075082 A | 4/2014 |

(Continued)

OTHER PUBLICATIONS

A. Tanaka et al., Ensuring Quality of Shared Keys Through Quantum Key Distribution for Practical Application, IEEE Journal of Selected Topics in Quantum Electronics, vol. 15, No. 6, 2009 (Year: 2009).*

(Continued)

*Primary Examiner* — Emily E Larocque

(57) ABSTRACT

A synthetic judgment section performs synthetic judgment of randomness test for shared random numbers by combining a result of a first randomness test and a result of a second randomness test, the first randomness test being performed on the shared random numbers by a first communication device and the second randomness test being performed on the shared random numbers by a second communication device wherein a result of the synthetic judgment is safely notified to at least one of the first communication device and the second communication device, wherein the first randomness test and the second randomness test are different with respect to at least one of randomness test to be used and random number portion to be tested.

19 Claims, 10 Drawing Sheets

(56) References Cited

FOREIGN PATENT DOCUMENTS

WO    2017019507 A1    2/2017
WO    2017135444 A1    8/2017

OTHER PUBLICATIONS

A. Tanaka et al., High-Speed quantum Key Distribution System for 1-Mbps Real-Time Key Generation, IEEE Journal of Quantum Electronics, vol. 48, No. 4, 2012 (Year: 2012).*
International Search Report of PCT Application No. PCT/JP2018/039054 mailed Jan. 15, 2019.
Information-technology Promotion Agency Security Center, "Development survey on pseudo-randomness test tools", Electronic Government information security technology development project, Feb. 2003, pp. 1-80.

* cited by examiner

FIG. 7
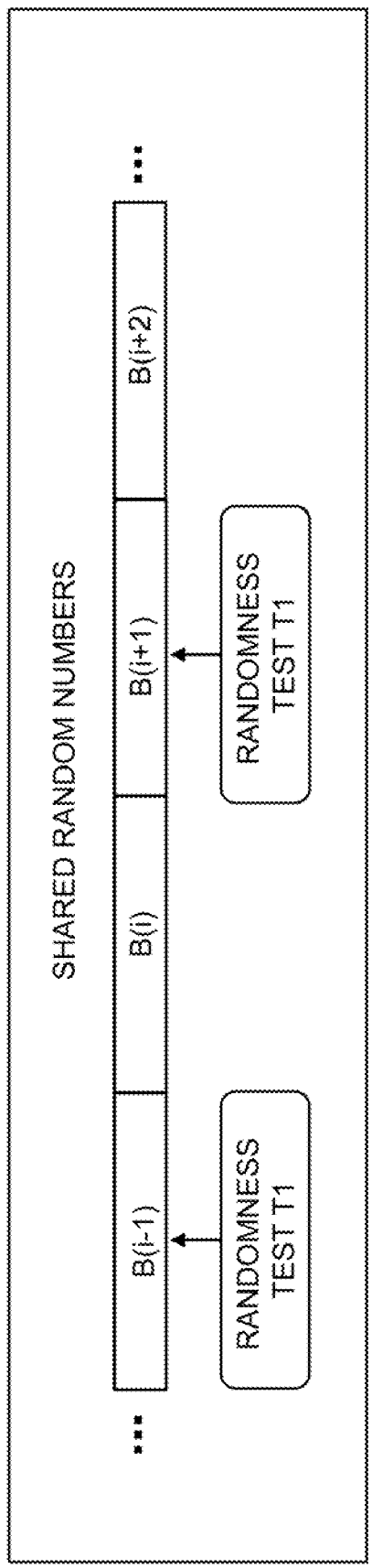
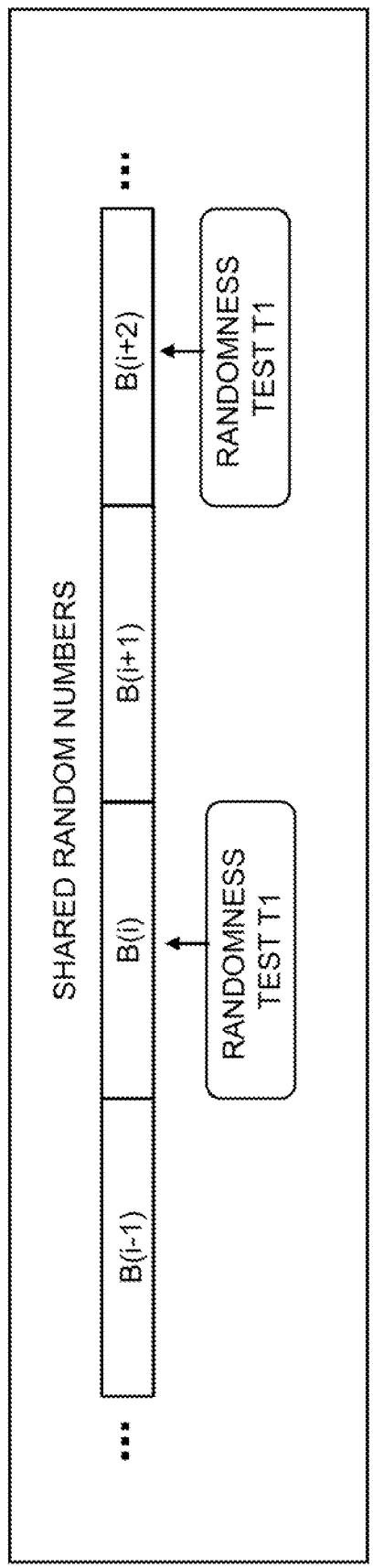

RANDOM NUMBER QUALITY MANAGEMENT METHOD AND APPARATUS

This application is a National Stage Entry of PCT/JP2018/039054 filed on Oct. 19, 2018, the contents of all of which are incorporated herein by reference, in their entirety.

TECHNICAL FIELD

The present invention relates to quality management techniques for random numbers, which is secret information used between communication devices.

A random number used as an encryption key or a seed of the encryption key is secret information that should be shared only between communication devices without being known to others. As a method for safely generating such shared secret random number, a key generation technique such as Quantum Key Distribution (QKD) is known. In addition, it is necessary to guarantee the randomness of the shared random number. There have been proposed some random number generation methods taking the randomness into account.

Patent Literature 1 discloses a method of generating a random number at a QKD transmitter, wherein the random number is a seed of a random number to be used. The QKD transmitter generates a pulse string with pulses randomly changing in phase, and then the pulse string passes through an optical interferometer in the QKD transmitter, which generates a pulse string with pulses randomly changing in intensity. Random numbers are extracted using this change in pulse intensity, and a plurality of randomness tests (Randomness test) are executed on the extracted random numbers. Only random numbers passing all the tests are used in each QKD process.

Further, Patent Literature 2 describes a method of checking the mark rate of the sifted key to adjust the light receiving efficiency of the QKD receiver so that the mark rate of the sifted key is reduced by half in order to guarantee the randomness of the shared random number in the QKD system.

Regarding the randomness test, several randomness test tools including a set of randomness test methods have been proposed. As typical test tools, NIST FIPS PUB 140-2, NIST Special Publication 800-22, DIE HARD, etc. are known (see Non-Patent Literature 1).

BACKGROUND ART LITERATURE LIST

Patent Literatures

[Patent Literature 1] International Publication No. WO2017/135444 A1
[Patent Literature 2] Japanese Patent Publication No. 2007-187698
[Non-Patent Literature 1] Survey Report "Development survey on pseudo-randomness test tools", Electronic Government information security technology development project (Information-technology Promotion Agency Security Center, Feb. 2003)

SUMMARY OF INVENTION

Problem to be Solved by Invention

The above-mentioned randomness test tools are a feasible, statistical test, which can be used to eliminate a string of random numbers having extremely low security. However, a single test just performs a test for a part of the properties of random numbers. Accordingly, passing these test tools only guarantees some of the properties of true random numbers, not true randomness.

A greater number of tests necessarily guarantees more reliable randomness. However, some tests require a large processing load. Accordingly, the greater number of tests increases the test load on a communication device, resulting in an increase in time required for test and a decrease in efficiency of random number generation.

Further, in the QKD communication device disclosed in Patent Literature 1, random numbers are generated and tested on the transmitting side. In the QKD communication device disclosed in Patent Literature 2, the properties of the shared random numbers are checked on the receiving side. Accordingly, the test loads of the communication devices cannot be reduced.

Therefore, an object of the present invention is to provide a random number quality management method and apparatus capable of achieving both guarantee of randomness and reduction of randomness test load.

Means for Solving the Problem

A random number quality management device according to the present invention is a device for managing quality of shared random numbers safely generated between a first communication device and a second communication device, including: judgement means that performs synthetic judgment of randomness test for the shared random numbers by combining a result of a first randomness test and a result of a second randomness test, the first randomness test being performed on the shared random numbers by the first communication device, and the second randomness test being performed on the shared random numbers by the second communication device; and communication means that safely notifies a result of the synthetic judgment to at least one of the first communication device and the second communication device, wherein the first randomness test and the second randomness test are different with respect to at least one of randomness test to be used and random number portion to be tested.

A random number quality management method according to the present invention is a method for managing quality of shared random numbers safely generated between a first communication device and a second communication device, including: by communication means, safely receiving a result of a first randomness test performed on the shared random numbers from the first communication device, and safely receiving a result of a second randomness test performed on the shared random numbers from the second communication device; by judgement means, performing synthetic judgment of randomness test for the shared random numbers by combining a result of a first randomness test and a result of a second randomness test; and by the communication means, safely notifying a result of the synthetic judgment to at least one of the first communication device and the second communication device, wherein the first randomness test and the second randomness test are different with respect to at least one of randomness test to be used and random number portion to be tested.

A program according to the present invention is a program for functioning a computer as a random number quality management device for managing quality of shared random numbers safely generated between a first communication device and a second communication device, the program including: a function of performing synthetic judgment of randomness test for the shared random numbers by combining a result of a first randomness test and a result of a second randomness test, the first randomness test being performed on the shared random numbers by the first communication device, and the second randomness test being performed on the shared random numbers by the second communication device; and a function of safely notifying a result of the synthetic judgment to at least one of the first communication device and the second communication device, wherein the first randomness test and the second randomness test are different with respect to at least one of randomness test to be used and random number portion to be tested.

Advantages of Invention

According to the present invention, the test for the shared random number is shared between a first communication device and a second communication device, achieving both the guarantee of randomness and the reduction of the randomness test load.

BRIEF DESCRIPTION OF DRAWINGS

FIG. 7 is a schematic diagram showing an example of a string of shared random numbers to which the random number management method according to the second exemplary embodiment is applied.

EXEMPLARY EMBODIMENTS OF INVENTION

<Outline of Exemplary Embodiments>

According to an exemplary embodiment of the present invention, the test for shared random numbers safely generated between communication devices is shared between communication devices. More specifically, the randomness test for the shared random numbers that are commonly divided into blocks is shared as follows.

(1) Sharing of test methods

Different test methods are used on a transmitting side and a receiving side. For instance, the transmitting side uses a first test method and the receiving side uses a second test method for the random numbers of the same block. Only the random numbers of the block that have passed both test methods are adopted as guaranteed random numbers. Since a test tool composed of a plurality of randomness tests can be used to execute different randomness tests on the transmitting side and the receiving side, the test processing by the test tool can be made more efficient.

(2) Sharing of test targets

On both the transmitting side and the receiving side, the same test method is used and applied to different blocks of random numbers in a single string of shared random numbers. For instance, test target blocks of the string of shared random numbers are distributed between the transmitting side and the receiving side, and each side executes the test for blocks allocated to the side. When passing the tests of the transmitting side and receiving side, the random numbers of the corresponding block are adopted as the guaranteed random numbers. Since the shared random numbers are divided into blocks on the transmitting side and the receiving side, each of the transmitting side and the receiving side performs the test on only blocks the side has in its charge, resulting in efficient test with the single test method.

It should be noted that the above-mentioned sharing methods (1) and (2) can also be combined. Specifically, it is also possible to apply different randomness tests to different random number blocks.

As described above, the randomness test is shared among the transmitting side and the receiving side, allowing reduction of test load on the communication device generating the shared random numbers.

Hereinafter, an exemplary embodiment of the present invention will be described in detail with reference to the drawings. It should be noted that the components described in the following embodiments are merely shown by example without intention of restricting the technical scope of the present invention.

<System Configuration>

Figure 1:
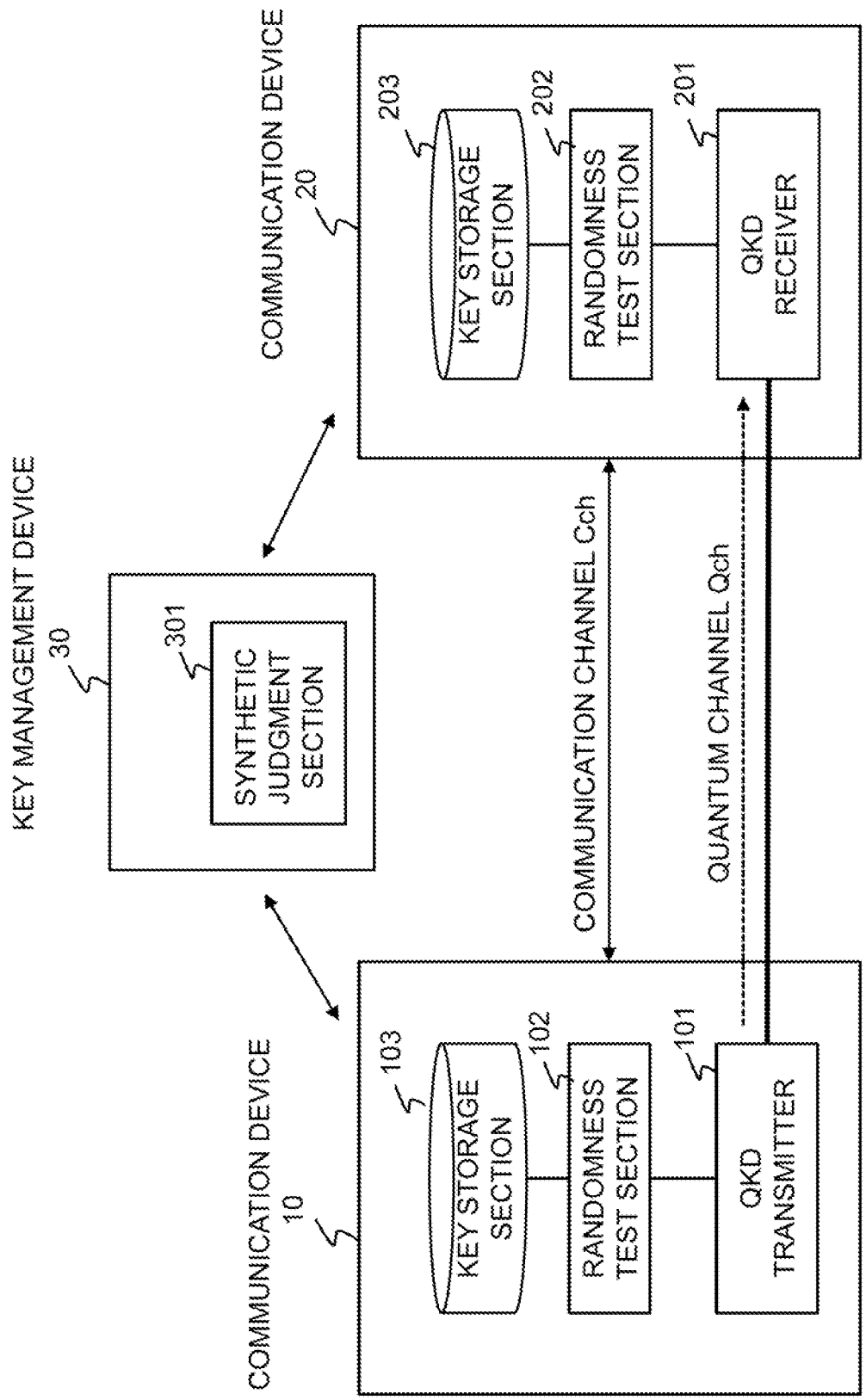
FIG. 1 is a configuration diagram of a communication system to which the random number management method according to the present invention can be applied.

As illustrated in FIG. 1, it is assumed that the communication device 10, the communication device 20 and the key management device 30 are connected such that they can communicate with each other. The communication device 10 is provided with a QKD transmitter 101, a randomness test section 102, and a key storage section 103 in addition to commonly used communication sections and other functional sections. In FIG. 1, the usual communication sections and other functional sections are omitted in order to avoid complication. Similarly, the communication device 20 is also provided with a QKD receiver 201, a randomness test section 202, and a key storage section 203 in addition to commonly used communication sections and other functional sections.

The QKD transmitter 101 and the QKD receiver 201 performs key generation processing through a quantum channel Qch and a commonly used communication channel Cch to generate common random numbers. The random numbers generated at each of the QKD transmitter 101 and the QKD receiver 201 are subjected to predetermined randomness test by the randomness test sections 102 and 202 as described later, and the test results thereof are safely notified to the key management device 30.

The randomness test sections 102 and 202 is capable of using a plurality of randomness test methods included in the same randomness test set in a predetermined order. Depending on which of the above-mentioned sharing methods (1) and (2) of randomness tests is used, the followings are set: a randomness test method to be used by the randomness test sections 102 and 202; the use order of the randomness test method; and the random number block to which the randomness test method should be applied. This setting may be predetermined in the randomness test sections 102 and 202 or may be determined by control by the key management device 30 or another control device.

The key management device 30 includes a synthetic judgment section 301 in addition to a function of managing the amount of key stored in the communication devices 10 and 20. As will be described later, the synthetic judgment section 301 synthesizes the randomness test results notified from the communication devices 10 and 20 and determines the suitability of each random number block. The synthetic judgment result is securely notified to each communication device by one-time pad encryption or the like. The communication devices 10 and 20 store, as a secure key, the random numbers included in blocks judged as passed by the synthetic judgment section 301 in the key storage sections 103 and 203.

<Shared Random Number Generation Process>

In the system as illustrated in FIG. 1, the random numbers shared between the QKD transmitter 101 and the QKD receiver 201 are generated by the QKD key generation process. Note that the shared random number generation process is not limited to QKD and may be any process that can safely generate secret random numbers shared between communication devices. Hereinafter, the QKD key generation process will be briefly described with reference to FIG. 2.

Figure 2:
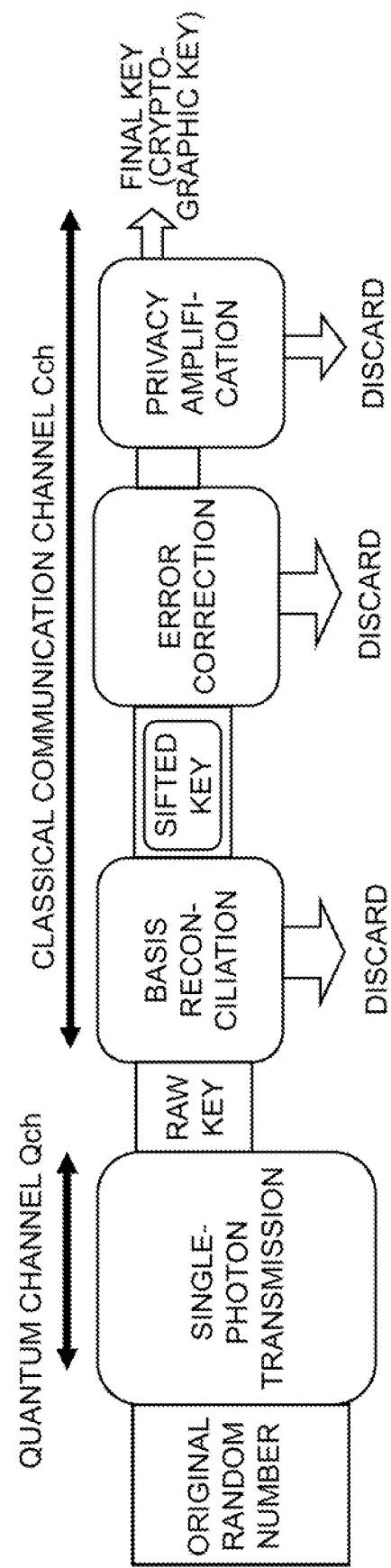
FIG. 2 is a flowchart showing a general flow of quantum cryptography key generation that can be adopted in the system as shown in FIG. 1.

Referring to FIG. 2, in single-photon transmission, the QKD transmitter 101 transmits optical pulses of single-photon level modulated in phase according to random numbers, to the QKD receiver 201 through the quantum channel Qch. There are several proposals for QKD scheme. For instance, the BB84 method using four quantum states is widely known. Most of the random numbers transmitted by the QKD transmitter 101 are lost due to loss of the transmission line or the like. Random numbers received by the QKD receiver 201 are called a raw key.

Subsequently, the basis reconciliation is performed through the communication channel Cch by common or classical light different from the quantum channel Qch. The QKD receiver 201 notifies the QKD transmitter 101 of the bit number and the reception basis of a received bit through the communication channel Cch. The QKD transmitter 101 reconciles the reception basis of the received bit number with the transmission basis that has been used when transmitting the bit, and sifts out only the bits in which the transmission basis matches the reception basis. This sifted bit string is called a sifted key.

There is a possibility that the sifted key thus generated contain communication errors. Accordingly, the sifted key is not always a completely matching string of random numbers between the QKD transmitter 101 and the QKD receiver 201. Therefore, the error correction is repeated until the sifted key of the QKD transmitter 101 matches that of the QKD receiver 201 while exchanging the sifted keys in part between the QKD transmitter 101 and the QKD receiver 201 through the communication channel Cch. As an error correction method, a BCH code or an LDPC (low-density parity-check code) code may be employed, which are also used in conventional communications.

However, it cannot be affirmed that the corrected errors are those caused only by the loss along the transmission path. The QKD technology always assumes an eavesdropper to be present. If an eavesdropper is present, it reflects on the error rate. Accordingly, to make an eavesdropping act ineffective, privacy amplification processing is performed on the identical sifted keys. In the privacy amplification processing, the amount of information estimated to be eavesdropped is randomly discarded from the sifted key, so that the state held by the eavesdropper cannot be distinguished from the non-information state. A key thus obtained finally by subjecting the error-corrected sifted key to the privacy amplification processing is called a final key.

As illustrated in FIG. 2, based on the original random numbers generated by the QKD transmitter 101, common random numbers (final key) are safely generated in both the QKD transmitter 101 and the QKD receiver 201 through the key generation process including the single-photon transmission, basis reconciliation, error correction and privacy amplification. Note that the shared random numbers (final key) are divided into blocks and are commonly managed according to block numbers.

Hereinafter, a first exemplary embodiment and a second exemplary embodiment of the present invention will be described by taking the above-mentioned communication system as an example.

1. First Exemplary Embodiment

According to the first exemplary embodiment of the present invention, the communication device 10 on the transmitting side and the communication device 20 on the receiving side perform a test for a string of shared random numbers using different randomness test methods. Therefore, a plurality of randomness tests can be shared among the communication devices 10 and 20, resulting in efficient test processing by a test tool. Only the random numbers of a block that has passed both tests are accumulated as guaranteed random numbers. Hereinafter, a quality management method according to the first exemplary embodiment will be described with reference to FIGS. 3 to 5.

1.1) Randomness Test Sequence

Figure 3:
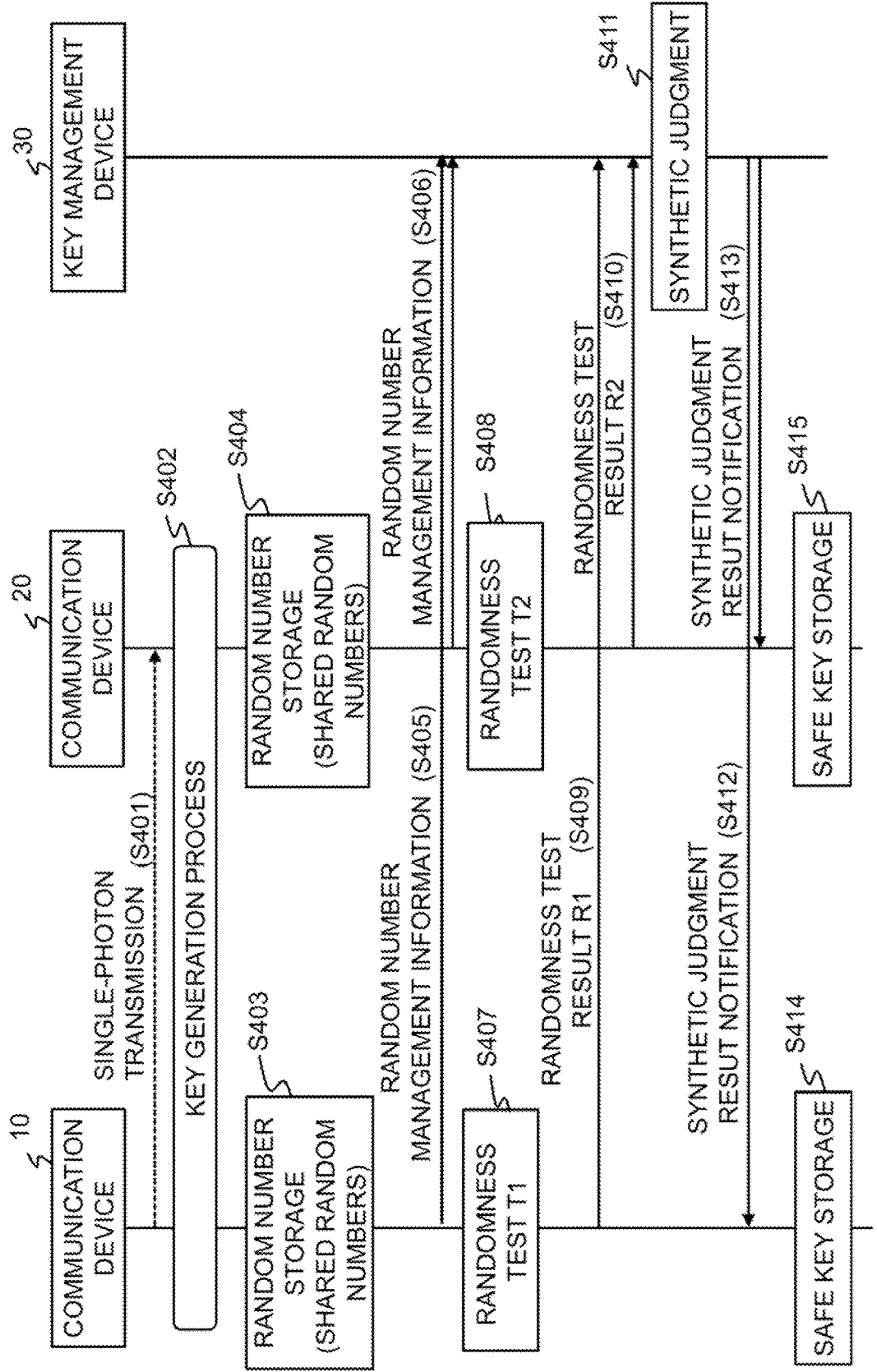
FIG. 3 is a sequence diagram showing a random number management method according to a first exemplary embodiment of the present invention.
Figure 4:
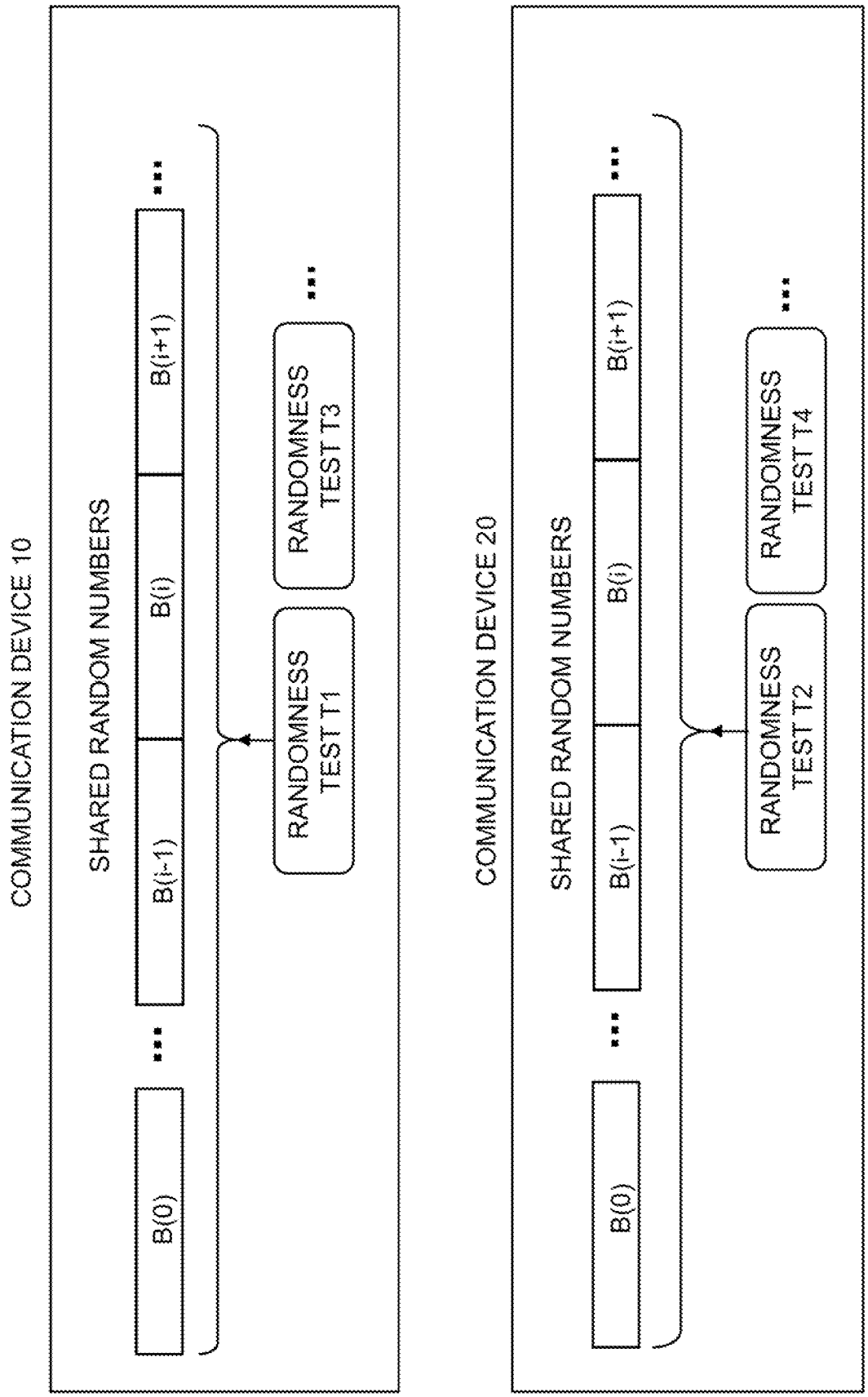
FIG. 4 is a schematic diagram showing an example of a string of shared random numbers to which the random number management method according to the first exemplary embodiment is applied.

As illustrated in FIG. 3, the QKD transmitter 101 of the communication device 10 and the QKD receiver 201 of the communication device 20 generate block-divided shared random numbers by the shared random number generation process as described above. (Operations S401 to S404). When the shared random numbers are generated, the communication device 10 and/or the communication device 20 may notify the key management device 30 of random number information including serial numbers of shared random number blocks: B(0), B(1), . . . B(i-1), B(i), . . . (Operations S405 and S406). These random number block numbers may be notified in predetermined numbers on the random number management information. FIG. 4 shows an example of block-divided shared random numbers in the communication devices 10 and 20.

It is assumed that the randomness test sections 102 and 202 have a test tool including the same randomness test methods and are previously set so that different randomness test methods are sequentially used in the test tool. Such a test method setting may be made by the communication devices 10 and 20 or from the outside such as the key management device 30, a network control device or the like.

When the shared random numbers have been generated, the randomness test sections 102 and 202 use different randomness test methods T1 and T2 to sequentially perform the randomness tests for each random number block (Operations S407 and S408). If another randomness test method (T3, T4, etc.) remains, the same test processing is repeated. The test results R1 and R2 of each random number block respectively by the randomness test sections 102 and 202 are notified to the key management device 30 (Operations S409 and S410). Although the randomness test can be performed at any timing, it can be performed at the timing when the coding rate in the above-mentioned error correction is changed.

For the test results R1 and R2, a numerical value of "1" can be used if the randomness test method is passed, and a numerical value of "0" if failed. Alternatively, as the test results R1 and R2, a value p itself for pass/fail obtained by the randomness test method may be used.

When receiving the test results R1 and R2 for each random number block, the synthetic judgment section 301 of the key management device 30 uses the received test results R1 and R2 to finally make a pass/fail judgment on the random number block (operation S411).

Figure 5:
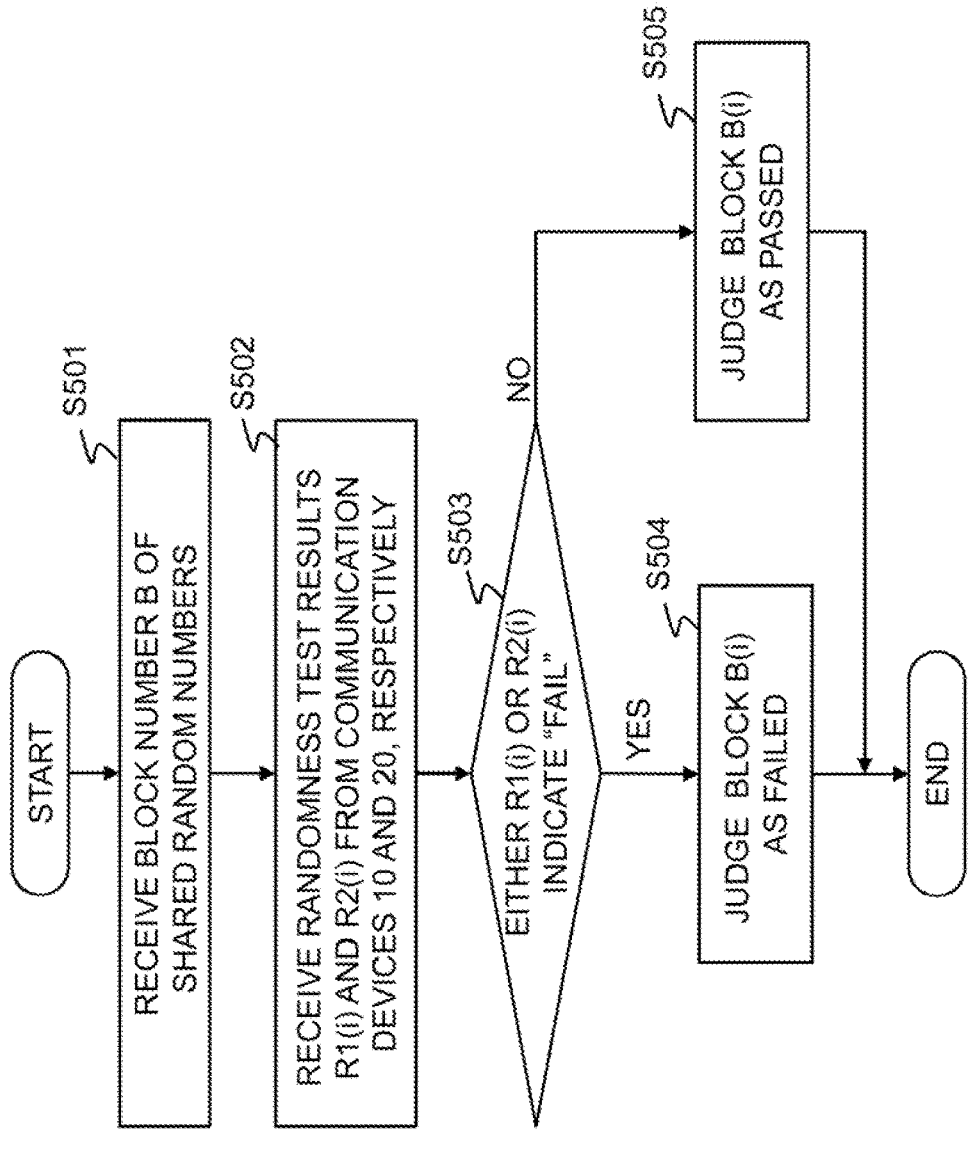
FIG. 5 is a flowchart showing an example of the random number management method according to the first exemplary embodiment.

The key management device 30 notifies the communication devices 10 and 20 of the synthetic judgment result for each random number block, that is, the pass/fail result (Operations S412 and S413). The respective communication devices 10 and 20, when receiving the synthetic judgment result, store only the random number blocks judged as passed in the key storage sections 103 and 203 (Operations S414 and S415). For instance, even if one of the test results R1 is "1", the random number block is judged as failed if the other R2 is "0" and therefore the random number block is not adopted as an encryption key. In other words, the random number block passes only when both R1 and R2 are "1" and is adopted as the encryption key. FIG. 5 shows a judgment method of the synthetic judgment section 301 of the key management device 30.

1.2) Synthetic Judgment

Referring to FIG. 5, it is assumed that the synthetic judgment section 301 of the key management device 30 receives from the communication device 10 and the communication device 20 safely by one-time pad encryption or the like the random number management information including the block number B(i) (i=0, 1, 2, ..., n) of the shared random numbers and the information of the randomness test methods T1 and T2 to be used (Operation S501).

Subsequently, the synthetic judgment section 301 receives the randomness test result R1(i) of block B(i) from the communication device 10 and the randomness test result R2(i) of block B(i) from the communication device 20 (Operation S502). The synthetic judgment section 301 determines whether or not at least one of these randomness test results R1(i) and R2(i) indicates "failed" (Operation S503). If at least one of the randomness test results R1(i) and R2(i) indicates "failed", the synthetic judgment section 301 judges the string of random numbers of the block B(i) to be failed and, if both the randomness test results R1(i) and R2(i) indicates "passed", judges the string of random numbers of the block B(i) to be passed (Operation S505).

Various logics can be used for the pass/fail judgment method. For instance, assuming that the test results R1(i) and R2(i) are the above-mentioned binary (1/0) pass/fail results, the random numbers in the block B(i) is judged as passed only when R1(i).and.R2(i)=1. For instance, it is assumed that the communication device 10 transmits the test results R1(0) ... R1(n-1) of n blocks to the key management device 30 in the order of block numbers by packets encrypted by one-time pad encryption or the like. Similarly, it is assumed that the communication device 20 transmits the test results R2(0) ... R2(n-1) of n blocks to the key management device 30 in the order of block numbers by packets encrypted by one-time pad encryption or the like. As an example, it is assumed that the following test results R1 and R2 are transmitted:

R1(0) ... R1(n-1)=11001 ... 0111; and
R2(0) ... R2(n-1)=10011 ... 1101.

When receiving the data, the synthetic judgment section 301 of the key management device 30 takes the logical product of the results R1 and R2 for each corresponding block and notifies each communication device of the results of the logical product as the synthetic judgment results S(0) ... S(n-1). In the case of the above test results R1 and R2, the synthetic judgment result S is represented by S(0) ... S(n-1)=10001 ... 0101.

By returning the synthetic judgment result S to each communication device sequentially or collectively, each communication device can know the pass/fail of each block. Specifically, each communication device can specify the string of random numbers in a block corresponding to "1" indicating "pass" as a secure key.

When the test results R1(i) and R2(i) are values p1 and p2 for pass/fail in the randomness test methods T1 and T2, respectively, the synthetic judgment section 301 performs synthetic pass/fail judgment by comparing the values p1 and p2 with judgment criteria corresponding to the randomness test methods, respectively. This method has an advantage that the judgment criteria can be set to desired levels on the side of the key management device 30.

It is not necessary to provide one criterion corresponding to each randomness test method. It is possible to make a pass/fail judgment in multiple stages by comparing a value for pass/fail with criteria of different levels. For instance, assuming that two judgment criteria are TH1 and TH2 (TH1<TH2), if p<TH1, then the pass/fail result is "00"=Bad; if TH1<p <TH2, then the pass/fail result is "01" or "10"=Good; and if TH2<p, the pass/fail result is "11"=Excellent. In this way, the judgment result can be graded. Such a judgment result may be a criterion for the communication device to select the use of a string of random numbers of each block. For instance, the string of random numbers with excellent security is used for important information, and the string of random numbers with good security is used for other information. Alternatively, different applications may be used appropriately according to the above-mentioned grade.

The pass/fail judgment result of the block B(i) thus obtained is securely notified to the communication devices 10 and 20 by one-time pad encryption or the like. The communication devices 10 and 20 store the string of random numbers of the block B(i) that has been judged as passed by the key management device 30 as a secure key in the key storage sections 103 and 203, respectively.

2. Second Exemplary Embodiment

According to the second embodiment of the present invention, for a string of random numbers shared between the communication device 10 on the transmitting side and the communication device 20 on the receiving side, one communication device is charged with the randomness test for a portion of the shared string of random numbers and the other communication device is charged with the randomness test for the remaining portion. When the randomness test is passed by either of the communication devices 10 and 20, the random numbers of the block are adopted as the guaranteed random numbers. The communication devices 10 and 20 need to perform the test for only the portions they have in charge. Accordingly, the randomness test using one test method can be efficiently performed. Hereinafter, the quality management method according to the second exemplary embodiment will be described with reference to FIGS. 6 to 8.

2.1) Randomness Test Sequence

Figure 6:
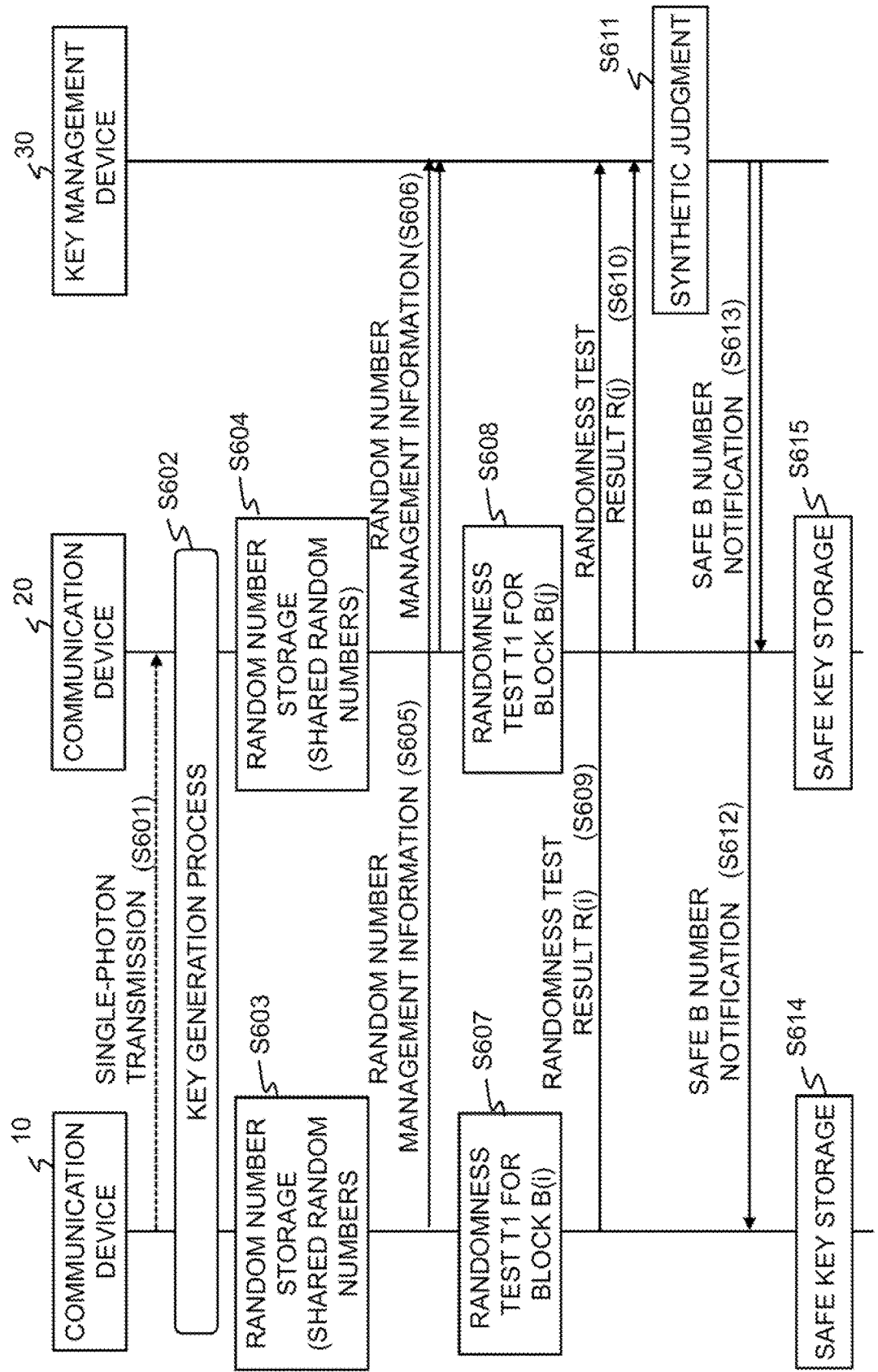
FIG. 6 is a sequence diagram showing a random number management method according to the second exemplary embodiment of the present invention.

As illustrated in FIG. 6, the QKD transmitter 101 of the communication device 10 and the QKD receiver 201 of the communication device 20 generate block-divided shared random numbers by the shared random number generation process as described above (Operations S601 to S604). When the shared random numbers are generated, the communication device 10 and/or the communication device 20 may notify the key management device 30 of random number information including serial numbers of shared random number blocks: B(0), B(1), ... B(i-1), B(i), ... (Operations S605 and S606). These random number block numbers may be notified in predetermined numbers on the random number management information. FIG. 7 shows an example of block-divided, shared random numbers in the communication devices 10 and 20.

It is assumed that the randomness test sections 102 and 202 have a test tool including the same randomness test methods and are previously set so that the same randomness test method is sequentially used in this tool. Further, it is assumed that the randomness test sections 102 and 202 are preset so that the blocks to be tested do not overlap each other and are adjacent to each other, as illustrated in FIG. 7. However, FIG. 7 shows an example, and the randomness test sections 102 and 202 can be set such that a test target block is selected not only alternately one by one, but also in units of a plurality of blocks or according to a predetermined pattern. Such a test method and test target setting may be performed by the communication devices 10 and 20, or from the outside such as a key management device 30 or a network control device.

When the shared random numbers have been generated, the randomness test sections 102 and 202 use one randomness test method T1 to sequentially perform the randomness tests for different random number blocks B(i) and B(j) (I, j=0,1,2, ..., n-1 and i≠j) which are set as mentioned above (Operations S607 and S608). If another randomness test method (T2, T3, ... ) remains, the same test processing is repeated. The randomness test section 102 notifies test result R(i) of the random number block B(i) to the key management device 30 (Operation S609). The randomness test section 202 notifies test results R(j) of the random number block B(j) to the key management device 30 (Operation S610).

For the test results R(i) and R(j), a numerical value of "1" can be used if each randomness test method is passed, and a numerical value of "0" if failed. Alternatively, as the test results R(i) and R(j), a value p itself for pass/fail obtained by the randomness test method may be used.

When receiving the test results R(i) and R(j) for each random number block, the synthetic judgment section 301 of the key management device 30 uses the received test results R(i) and R(j) to finally make a pass/fail judgment on the random number blocks B(i) and B(j), respectively (Operation S611).

Figure 8:
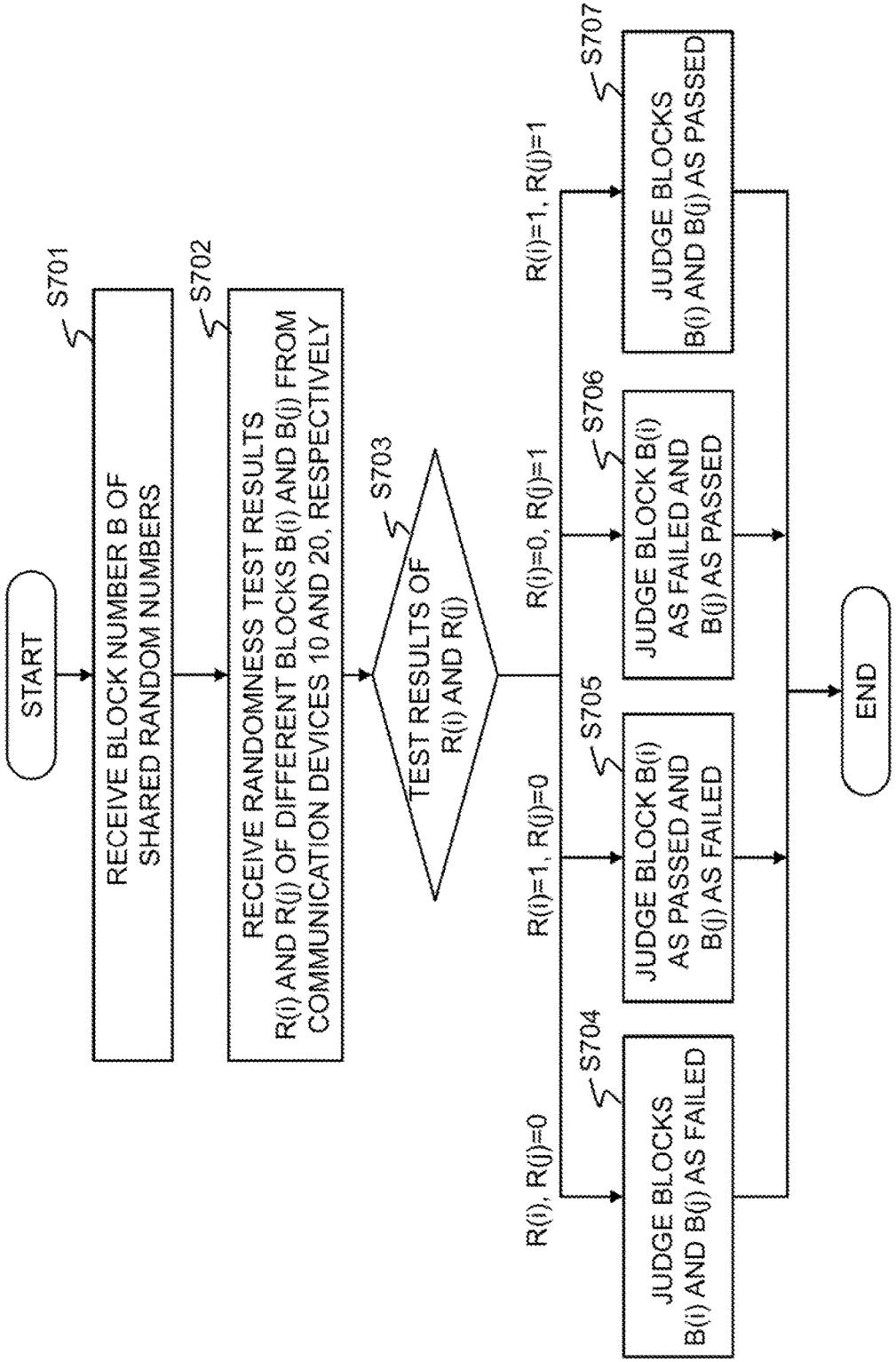
FIG. 8 is a flowchart showing an example of the random number management method according to the second exemplary embodiment.

The key management device 30 notifies the communication devices 10 and 20 of the synthetic judgment result for each random number block, that is, the pass/fail result (Operations S612 and S613). The respective communication devices 10 and 20, when receiving the synthetic judgment result, store only the random number blocks judged as passed in the key storage sections 103 and 203 (Operations S614 and S615). According to the resent exemplary embodiment, the respective pass/fail results of the test results R(i) and R(j) become as they are the pass/fail results of random number blocks B(i) and B(j). FIG. 8 shows a judgment method of the synthetic judgment section 301 of the key management device 30.

2.2) Synthetic Judgment

Referring to FIG. 8, it is assumed that the synthetic judgment section 301 of the key management device 30 receives from the communication device 10 and the communication device 20 safely by one-time pad encryption or the like the random number management information including the block number B(i) (i=0, 1, 2, ..., n) of the shared random numbers and the information of the randomness test method T1 to be used (Operation S701).

Subsequently, the synthetic judgment section 301 receives the randomness test result R(i) of block B(i) from the communication device 10 and the randomness test result R (j) of block B(j) from the communication device 20 (Operation S702). The synthetic judgment section 301 judges the pass/fail of the blocks B(i) and B(j) depending on a combination of the test results R(i) and R(j) (Operation S703-S707). More specifically, if both the test results R(i) and R(j) is "0" indicative of fail, the synthetic judgment section 301 judges both of the block B(i) and B(j) to be failed (Operation S704). If the test result R(i) is "1" indicative of pass and R(j) is "0" indicative of fail, then the block B(i) is judged as passed and the block B(j) as failed (Operation S705). Similarly, if the test result R(i) is "0" indicative of fail and R(j) is "1" indicative of pass, then the block B(i) is judged as failed and the block B(j) as passed (Operation S706). If both the test results R(i) and R(j) is "1" indicative of pass, the synthetic judgment section 301 judges both of the blocks B(i) and B(j) to be passed (Operation S707).

In the block division method as shown in FIG. 7, it is assumed that the blocks tested by the communication device 10 are B(0), B(2), B(n-2), and the blocks tested by the communication device 20 are B(1), B(3), ... B(n-1). As an example, it is assumed that the key management device 30 receives the following test results R(i) and R(j):
R(0), R(2), ..., R(n-2)=1 1 0 1 ... 0 1 1 1
R(1), R(3), ..., R(n-1)=1 0 1 1 ... 1 1 0 1.
In this case, the synthetic judgment result S (0) ... S (n-1)=11100000111 ... 011110111 is notified to each communication device. By sending the synthetic judgment result S back to each communication device sequentially or collectively, each communication device can be notified of the pass/fail of each block and thereby the string of random numbers of a block corresponding to "1" indicating pass can be specified as a secure key.

In the case where the test results R(i) and R(j) are for instance a value p for pass/fail in the randomness test method T1, the synthetic judgment section 301 performs synthetic pass/fail judgment by comparing the value p with judgment criteria corresponding to each randomness test method. This method has an advantage that the judgment criteria can be set to desired levels on the side of the key management device 30.

It is not necessary to provide one criterion corresponding to the randomness test method T1. It is possible to make a pass/fail judgment in multiple stages by comparing a value for pass/fail with criteria of different levels. For instance, assuming that two judgment criteria are TH1 and TH2 (TH1<TH2), if p<TH1, then the pass/fail result is "00"=Bad; if TH1<p<TH2, then the pass/fail result is "01" or "10"=Good; and if TH2<p, the pass/fail result is "11"=Excellent. In this way, the judgment result can be graded. Such a judgment result may be a criterion for the communication device to select the use of a string of random numbers of each block. For instance, the string of random numbers with excellent security is used for important information, and the string of random numbers with good security is used for other information. Alternatively, different applications may be used appropriately according to the above-mentioned grade.

The communication devices 10 and 20 store the string of random numbers of the block judged as passed by the key management device 30 as a secure key in the key storage sections 103 and 203, respectively.

3. Third Exemplary Embodiment

According to the third exemplary embodiment of the present invention, the functions of the key management device 30 in the first and second embodiments as described above may be implemented in each communication device, and these key management functions cooperate with each other to implement the above-mentioned functions of the synthetic judgment section 301. These key management functions work together to realize the same functions as the key management device 30 as described above. For example, the key management section of one communication device safely receives the randomness test result R from the key management section of the other communication device by one-time pad encryption or the like, thereby performing the synthetic judgment similar to the first exemplary embodiment or the second exemplary embodiment as described above, so that the judgment result can be transmitted to the other communication device safely by one-time pad encryption or the like. Accordingly, either one of the communication device on the transmitting side and the communication device on the receiving side may be provided with a function equivalent to the synthetic judgment section 301.

4. Example

Figure 9:
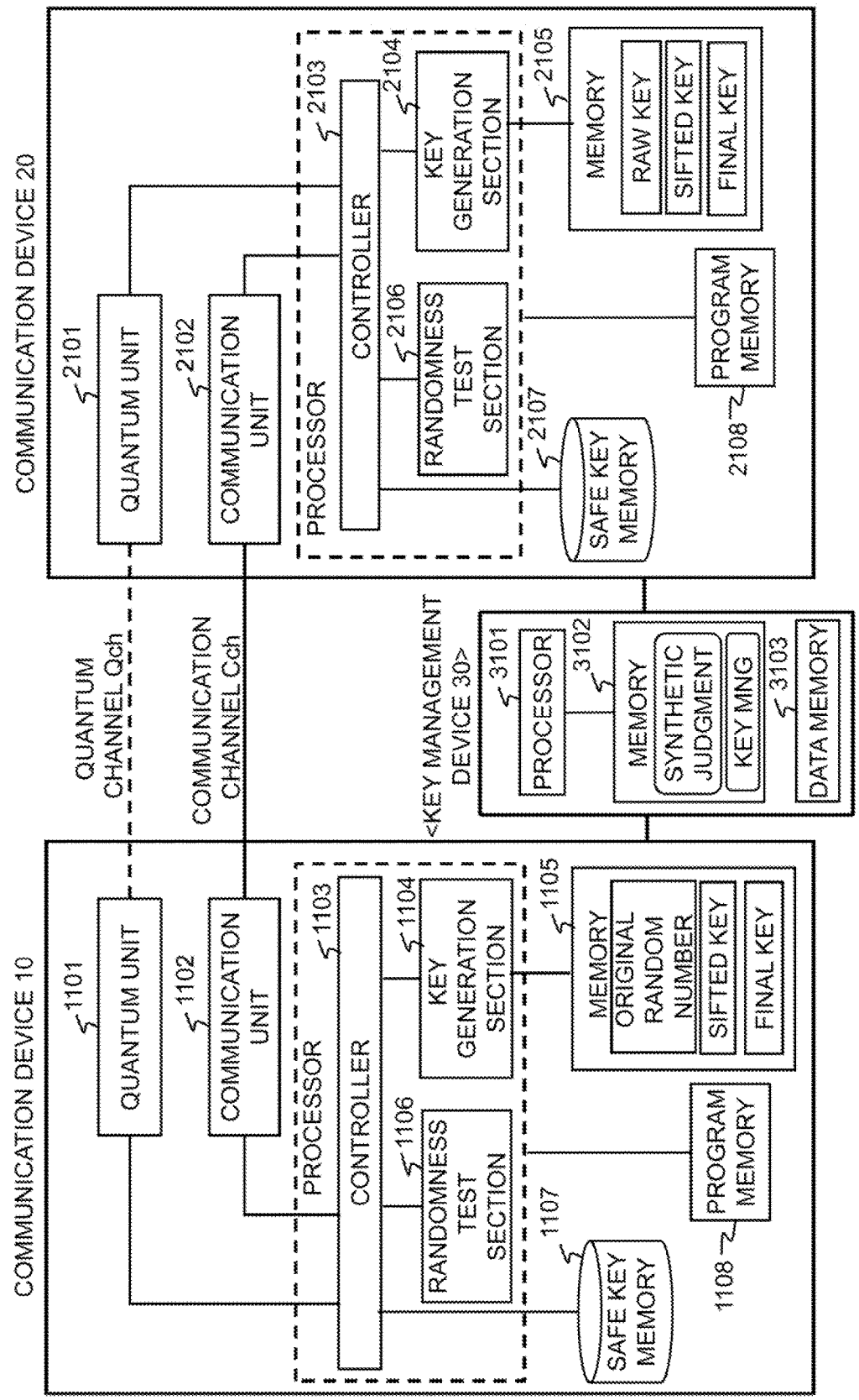
FIG. 9 is a configuration diagram showing a QKD system according to an example of the present invention.

Hereinafter, an example of a QKD system that implements the random number quality management method according to the first exemplary embodiment and the second exemplary embodiment as described above will be described in detail with reference to FIGS. 9 and 10. FIG. 9 illustrates a more detailed configuration of the communication system illustrated in FIG. 1.

4.1) System Configuration

As illustrated in FIG. 9, the QKD system has a configuration such that the communication device 10 and the communication device 20 are connected by a plurality of communication channels through an optical transmission medium, wherein the communication devices 10 and 20 are securely connected to the key management device 30 by secure channels. The communication device 10 includes a quantum section 1101 and a communication section 1102, and the communication device 20 includes a quantum section 2101 and a communication section 2102. The quantum sections 1101 and 2101 are connected by the quantum channel Qch, and the communication sections 1102 and 2102 are connected by the communication channel Cch.

The quantum section 1101 of the communication device 10 carries random bit information on weak optical pulses of one photon or less per bit, for example, by phase modulation. The weak optical pulses modulated by the random bit information are transmitted to the quantum section 2101 through the quantum channel Qch. The quantum section 2101 detects the weak optical pulses that has arrived and stores raw key data in the memory 2105. In general, timing cannot be extracted from such weak optical pulses. Accordingly, in this example, the communication device 10 separately transmits timing information to the communication device 20 through a synchronization channel with an optical power of the commonly used level.

A controller 1103 of the communication device 10 controls the key generation section 1104 and the randomness test section 1106. The key generation section 1104 performs the above-mentioned key generation process using the memory 1105 and stores the generated, sifted and final keys in the memory 1105. The randomness test section 1106 performs the above-mentioned randomness test on the final key and notifies the key management device 30 of the test result. As will be described later, the final key is divided into blocks as illustrated in FIG. 4 or 7. According to the judgment information from the key management device 30, the controller 1103 stores as a safety key in the memory 1107 the random numbers of a block judged as safe in the final key. It is necessary for the memory 1107 to securely store the encryption key. Here, a hard disk drive (HDD) which is a magnetic recording medium may be employed.

Further, the controller 1103 of the communication device 10 has a function of generating and counting frame pulses (FP). The frame pulses are transmitted to the communication device 20 through the synchronization channel. The count value of frame pulses can be used as an index when generating and managing the encryption key.

The controller 1103, the key generation section 1104, and the randomness test section 1106 can be implemented by running control program, key generation program and randomness test program on a processor such as a CPU (Central Processing Unit). These programs are stored in a memory 1108, read and started by the processor.

The controller 2103 of the communication device 20 controls the key generation section 2104 and the randomness test section 2106. The key generation section 2104 executes the key generation process using the memory 2105 and accumulates a sifted key and a final key. The randomness test section 2106 executes the above-mentioned randomness test on the final key and notifies the key management device 30 of the test result. As will be described later, the final key is divided into blocks as illustrated in FIG. 4 or 7 According to the judgment information from the key management device 30, the controller 2103 stores the random numbers of blocks judged as being safe in the final key as a safety key in the memory 2107. It is necessary that the memory 2107 is capable of securely storing the encryption key. Here a hard disk drive (HDD) which is a magnetic recording medium is used as the memory 2107.

Further, the controller 2103 of the communication device 20 has a function of counting frame pulses (FP). The frame pulses are received from the communication device 10 through the synchronization channel. The count value of frame pulses may be used as an index when generating and managing the encryption key.

The controller 2103, the key generation section 2104, and the randomness test section 2106 can be implemented by running control program, key generation program and randomness test program on a processor such as a CPU. These programs are stored in a memory 2108, read and started by the processor.

The single-photon transmission by the quantum sections 1101 and 2101 is not limited to a specific scheme. For instance, a one-way type may be used in which weak optical pulses carrying random information by modulation is transmitted in one direction from the quantum section 1101 of the communication device 10 to the quantum section 2101 of the communication device 20. Alternatively, a round-trip type may be used in which optical pulses are transmitted from the quantum section 2101 of the communication device 20 to the communication device 10, and weak optical pulses modulated by random information are transmitted from the quantum section 1101 of the communication device 10 back to the quantum section 2101 of the communication device 20.

The key management device 30 includes a processor 3101, a program memory 3102, and a data memory 3103, in addition to a communication section (not shown) for communicating with the communication devices 10 and 20. The memory 3102 stores necessary programs such as a key management program and a synthetic judgment program. The data memory 3103 stores data such as randomness test results received from the communication devices 10 and 20 and a calculation result of the synthetic judgment. The processor 3101 can execute the synthetic judgment as illustrated in FIG. 5 or 8 by running the synthetic judgment program.

4.2) Operation

Figure 10:
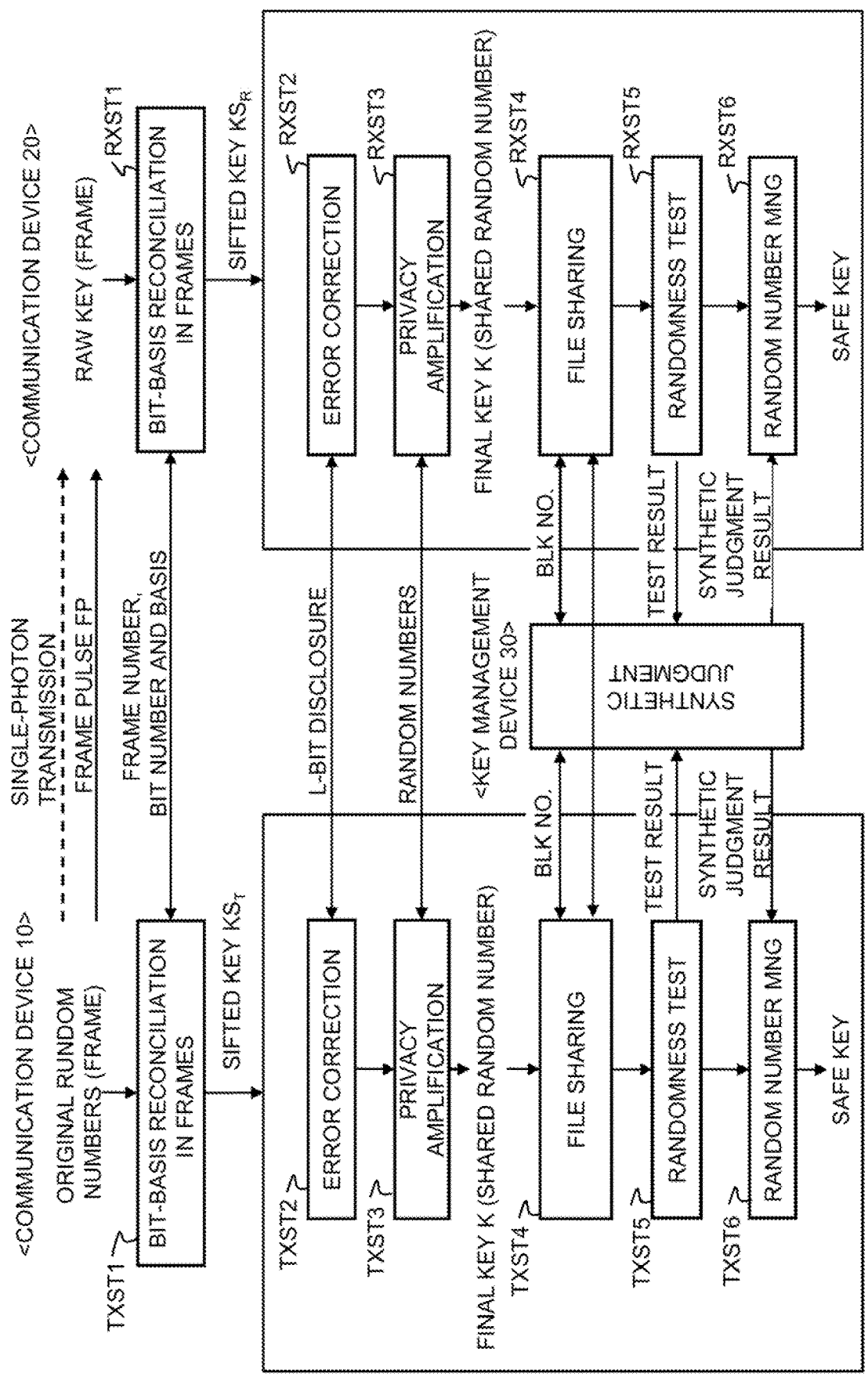
FIG. 10 is a diagram showing a communication sequence of the QKD system according to the example as shown in FIG. 9.

With reference to FIG. 10, the random number quality management in the above-mentioned QKD system will be described. As described above, by performing the single photon transmission and the frame pulse transmission from the communication device 10 to the communication device 20, the communication device 20 stores the raw key data by frame in the memory 2105.

Subsequently, the key generation section 1104 of the communication device 10 and the key generation section 2104 of the communication device 20 perform bit comparison and basis reconciliation with each other on a frame-by-frame basis through the communication channel Cch (TXST1, RXST1). More specifically, until bit comparison and basis reconciliation performed on a frame is complete, bit comparison and basis reconciliation on the next frame is not performed. The key generation section 1104 and the key generation section 2104, while referencing the respective FP count values, monitor the corresponding frames so that the respective corresponding frames are subjected to bit comparison and basis reconciliation through the communication channel Cch, the communication sections 1102 and 2202.

The sifted keys $KS_T$ and $KS_R$ are generated and stored at the communication device 10 and the communication device 20, respectively. When the amount of sifted key reaches a predetermined size, the sifted keys $KS_T$ and $KS_R$ are filed and stored along with file numbers in the memories 1105 and 2105, respectively. Here, a file is defined as a block of data aggregated on a basis of a predetermined size.

When the sifted key files $KS_T$ and $KS_R$ have been generated, next performed are error correction processing (TXST2, RXST2) and privacy amplification processing (TXST3, RXST3). The error correction processing and privacy amplification processing are performed by the file. Until the processing on a file is complete, the processing on the next file will not be performed.

As mentioned earlier, since the sifted keys $KS_T$ and $KS_R$ of each corresponding file might include communication errors, the sifted keys $KS_T$ and $KS_R$ are not always an identical string of random numbers. Accordingly, the key generation sections 1104 and 2104 repeat the error correction processing using the data communication functionality through the data communication channel Cch until the sifted keys $KS_T$ and $KS_R$ of the file in question match each other (TXST2, RXST2). In this event, the disclosed bits of the sifted keys KST and KSR are discarded.

Thus, when all errors have been corrected and the sifted keys $KS_T$ and $KS_R$ have matched each other, the key generation section 1104 and the key generation section 2104 next perform the privacy amplification processing on the respective matching sifted keys KS in order to make an eavesdropping act ineffective (TXST3, RXST3). In the privacy amplification processing, separately prepared random numbers are used to randomly discard the amount of information estimated to be eavesdropped from the sifted key KS so that the state held by the eavesdropper cannot be distinguished from the non-information state. In this manner, a final key K is obtained. The final key K is a shared random number in files (blocks) that matches between the communication devices 10 and 20.

When the final key K is stored in the memories 1105 and 2105, respectively, the key generation section 1104 and the key generation section 2104 notify the other communication device and the key management device 30 of the block numbers of the final key K through the communication channel Cch. (TXST4, RXST4).

Subsequently, the randomness test sections 1106 and 2106 perform the randomness test on the final key K as described in the first exemplary embodiment and the second exemplary embodiment and notify the key management device 30 of the test results. (TXST5, RXST5).

As described above, the key management device 30 judges the pass fail of the final key K in blocks using the test results received from the communication devices 10 and 20, and notifies the communication devices 10 and 20 of the judgment result. That is, the key management device 30 performs the synthetic judgment as shown in FIG. 5 or 8 and returns the pass/fail of the block to the communication devices 10 and 20.

The communication devices 10 and 20, when receiving the judgment result from the key management device 30, store only the random numbers of blocks of the final key K that have passed as safety keys in the memories 1107 and 2107, respectively (TXST6, RXST6).

Application software in accordance with the present disclosure, such as computer programs executed by the device and may be stored on one or more computer readable mediums. It is also contemplated that the steps identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

5. Supplementary Notes

The whole or part of the example embodiments disclosed above can be described as, but not limited to, the following supplementary notes.

(Supplementary Note 1)

A random number quality management device for managing quality of shared random numbers safely generated between a first communication device and a second communication device, comprising:

judgement means that performs synthetic judgment of randomness test for the shared random numbers by combining a result of a first randomness test and a result of a second randomness test, the first randomness test being performed on the shared random numbers by the first communication device, and the second randomness test being performed on the shared random numbers by the second communication device; and communication means that safely notifies a result of the synthetic judgment to at least one of the first communication device and the second communication device, wherein the first randomness test and the second randomness test are different with respect to at least one of randomness test to be used and random number portion to be tested.

(Supplementary Note 2)

The random number quality management device according to supplementary note 1, wherein the first randomness test performs a first test method on each random number block of the shared random numbers and the second randomness test performs a second test method on the random number block which is identical to that of the first test method, wherein the judgement means judges the random number block as passed only when the random number block passes both the first test method and the second test method.

(Supplementary Note 3)

The random number quality management device according to supplementary note 2, wherein the first test method and the second test method are different test methods included in a predetermined randomness test tool.

(Supplementary Note 4)

The random number quality management device according to supplementary note 3, wherein the first test method and the second test method are sequentially selected from a plurality of test methods included in the predetermined randomness test tool.

(Supplementary Note 5)

The random number quality management device according to supplementary note 1, wherein the first randomness test performs a predetermined test method on a predetermined random number block of the shared random numbers and the second randomness test performs the predetermined test method on random number blocks other than the predetermined random number blocks, wherein the judgement means judges a random number block passing the first test method and a random number block passing the second test method as being passed.

(Supplementary Note 6)

The random number quality management device according to supplementary note 5, wherein the predetermined test method is included in a predetermined randomness test tool.

(Supplementary Note 7)

The random number quality management device according to supplementary note 6, wherein the predetermined test method is sequentially selected from a plurality of test methods included in the predetermined randomness test tool.

(Supplementary Note 8)

The random number quality management device according to one of supplementary notes 1-7, wherein the shared random numbers are generated by quantum key distribution using transmission of optical pulses of single-photon levels between the first communication device and the second communication device.

(Supplementary Note 9)

A random number quality management method for managing quality of shared random numbers safely generated between a first communication device and a second communication device, comprising:

by communication means, safely receiving a result of a first randomness test performed on the shared random numbers from the first communication device, and safely receiving a result of a second randomness test performed on the shared random numbers from the second communication device;

by judgement means, performing synthetic judgment of randomness test for the shared random numbers by combining a result of a first randomness test and a result of a second randomness test;

by the communication means, safely notifying a result of the synthetic judgment to at least one of the first communication device and the second communication device, wherein the first randomness test and the second randomness test are different with respect to at least one of randomness test to be used and random number portion to be tested.

(Supplementary Note 10)

A program for functioning a computer as a random number quality management device for managing quality of shared random numbers safely generated between a first communication device and a second communication device, the program comprising:

a function of performing synthetic judgment of randomness test for the shared random numbers by combining a result of a first randomness test and a result of a second randomness test, the first randomness test being performed on the shared random numbers by the first communication device, and the second randomness test being performed on the shared random numbers by the second communication device; and a function of safely notifying a result of the synthetic judgment to at least one of the first communication device and the second communication device, wherein the first randomness test and the second randomness test are different with respect to at least one of randomness test to be used and random number portion to be tested.

(Supplementary Note 11)

A system comprising:

a first communication device;

a second communication device that safely generates shared random numbers with the first communication device; and a management device that manages quality of the shared random numbers, wherein the management device comprises:

judgement means that performs synthetic judgment of randomness test for the shared random numbers by combining a result of a first randomness test and a result of a second randomness test, the first randomness test being performed on the shared random numbers by the first communication device, and the second randomness test being performed on the shared random numbers by the second communication device; and communication means that safely notifies a result of the synthetic judgment to at least one of the first communication device and the second communication device, wherein the first randomness test and the second randomness test are different with respect to at least one of randomness test to be used and random number portion to be tested.

INDUSTRIAL APPLICABILITY

The present invention is generally applicable to systems and devices that manage the randomness and security of shared random numbers and is particularly suitable for quality management of encryption keys where confidentiality is important.

EXPLANATION OF SIGNS

10 Communication device
20 Communication device
30 Key management device
101 QKD transmitter
102 Randomness test section
103 Key storage section
201 QKD receiver
202 Randomness test section
203 Key storage section

The invention claimed is:

1. A device for managing quality of shared random numbers generated between a first communication device and a second communication device, comprising:
a memory that stores a set of instructions for synthetic judgment of randomness test results; and
a processor configured to execute instructions to:
perform the synthetic judgment for the shared random numbers by combining a result of a first randomness test and a result of a second randomness test, the first randomness test being performed on the shared random numbers by the first communication device, and the second randomness test being performed on the shared random numbers by the second communication device; and
notify a result of the synthetic judgment to at least one of the first communication device and the second communication device,
wherein the first randomness test and the second randomness test are different with respect to at least one of randomness test method and random number portion.

2. The device according to claim 1, wherein the shared random numbers are included in a random number block, the first randomness test performs a first test method on the random number block and the second randomness test performs a second test method on the random number block,
wherein in the synthetic judgment, the random number block is judged as passed only when the random number block passes both the first test method and the second test method.

3. The device according to claim 2, wherein the first test method and the second test method are different test methods included in a predetermined randomness test tool.

4. The device according to claim 3, wherein the first test method and the second test method are sequentially selected from a plurality of test methods included in the predetermined randomness test tool.

5. The device according to claim 1, wherein the first randomness test performs a predetermined test method on predetermined random number blocks of the shared random numbers and the second randomness test performs the predetermined test method on random number blocks other than the predetermined random number blocks,
wherein in the synthetic judgment, a first random number block passing the first randomness test and a second random number block passing the second randomness test are judged as being passed.

6. The device according to claim 5, wherein the predetermined test method is included in a predetermined randomness test tool.

7. The device according to claim 6, wherein the predetermined test method is sequentially selected from a plurality of test methods included in the predetermined randomness test tool.

8. The device according to claim 1, wherein the shared random numbers are generated by quantum key distribution using transmission of optical pulses of single-photon levels between the first communication device and the second communication device.

9. A method for managing quality of shared random numbers generated between a first communication device and a second communication device, comprising:
receiving a result of a first randomness test performed on the shared random numbers from the first communication
receiving a result of a second randomness test performed on the shared random numbers from the second communication device;
performing synthetic judgment of randomness test for the shared random numbers by combining a result of a first randomness test and a result of a second randomness test;
notifying a result of the synthetic judgment to at least one of the first communication device and the second communication device,
wherein the first randomness test and the second randomness test are different with respect to at least one of randomness test method and random number portion.

10. The method according to claim 9, wherein the shared random numbers are included in a random number block, the first randomness test performs a first test method on the random number block and the second randomness test performs a second test method on the random number block,
wherein in the synthetic judgment, the random number block is judged as passed only when the random number block passes both the first test method and the second test method.

11. The method according to claim 10, wherein the first test method and the second test method are different test methods included in a predetermined randomness test tool.

12. The method according to claim 11, wherein the first test method and the second test method are sequentially selected from a plurality of test methods included in the predetermined randomness test tool.

13. The method according to claim 9, wherein the first randomness test performs a predetermined test method on predetermined random number blocks of the shared random numbers and the second randomness test performs the predetermined test method on random number blocks other than the predetermined random number blocks,
wherein in the synthetic judgment, a first random number block passing the first randomness test and a second random number block passing the second randomness test are judged as being passed.

14. The method according to claim 13, wherein the predetermined test method is included in a predetermined randomness test tool.

15. The method according to claim 14, wherein the predetermined test method is sequentially selected from a plurality of test methods included in the predetermined randomness test tool.

16. The method according to claim 9, wherein the shared random numbers are generated by quantum key distribution using transmission of optical pulses of single-photon levels between the first communication device and the second communication device.

17. A non-transitory computer readable information storage medium storing a program which, when executed by a processor, performs a method comprising:
- receiving a result of a first randomness test performed on the shared random numbers from the first communication device;
- receiving a result of a second randomness test performed on the shared random numbers from the second communication device;
- performing synthetic judgment of randomness test for the shared random numbers by combining a result of a first randomness test and a result of a second randomness test;
- notifying a result of the synthetic judgment to at least one of the first communication device and the second communication device,
- wherein the first randomness test and the second randomness test are different with respect to at least one of randomness test method and random number portion.

18. The non-transitory computer readable information storage medium according to claim 10, wherein the shared random numbers are included in a random number block, the first randomness test performs a first test method on the random number block and the second randomness test performs a second test method on the random number block,
- wherein in the synthetic judgment, the random number block is judged as passed only when the random number block passes both the first test method and the second test method.

19. The non-transitory computer readable information storage medium according to claim 17, wherein the first randomness test performs a predetermined test method on predetermined random number blocks of the shared random numbers and the second randomness test performs the predetermined test method on random number blocks other than the predetermined random number blocks,
- wherein in the synthetic judgment, a first random number block passing the first randomness test and a second random number block passing the second randomness test are judged as being passed.

* * * * *